(12) United States Patent
Kang et al.

(10) Patent No.: US 7,647,556 B2
(45) Date of Patent: Jan. 12, 2010

(54) APPARATUS AND METHOD FOR SEARCHING FOR A VIDEO CLIP

(75) Inventors: Myung-won Kang, Yongin-si (KR); Du-il Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 10/586,238

(22) PCT Filed: Aug. 20, 2004

(86) PCT No.: PCT/KR2004/002096

§ 371 (c)(1),
(2), (4) Date: Jul. 17, 2006

(87) PCT Pub. No.: WO2005/069625

PCT Pub. Date: Jul. 28, 2005

(65) Prior Publication Data

US 2008/0222527 A1     Sep. 11, 2008

(30) Foreign Application Priority Data

Jan. 15, 2004 (KR) .................. 10-2004-0003031

(51) Int. Cl.
*G06F 3/00* (2006.01)

(52) U.S. Cl. .................. 715/723; 715/716; 715/719; 715/720

(58) Field of Classification Search .................. 715/723, 715/716, 719, 720
See application file for complete search history.

(56) References Cited

U.S. PATENT DOCUMENTS

| | | | |
|---|---|---|---|
| 5,237,648 A | 8/1993 | Mills et al. | |
| 5,999,173 A | 12/1999 | Ubillos | |
| 5,999,688 A * | 12/1999 | Iggulden et al. | 386/46 |
| 6,026,389 A * | 2/2000 | Nakajima et al. | 707/1 |
| 6,157,744 A * | 12/2000 | Nagasaka et al. | 382/236 |
| 6,278,446 B1 * | 8/2001 | Liou et al. | 715/700 |
| 6,370,316 B1 * | 4/2002 | Yamada et al. | 386/46 |
| 6,631,522 B1 | 10/2003 | Erdelyi | |
| 7,143,362 B2 * | 11/2006 | Dieberger et al. | 715/764 |
| 7,188,316 B2 * | 3/2007 | Gusmorino et al. | 715/764 |
| 2002/0069218 A1 * | 6/2002 | Sull et al. | 707/501.1 |
| 2006/0015888 A1 * | 1/2006 | Shih | 725/1 |
| 2006/0090141 A1 * | 4/2006 | Loui et al. | 715/764 |
| 2006/0251385 A1 * | 11/2006 | Hwang et al. | 386/54 |
| 2008/0034306 A1 * | 2/2008 | Ording | 715/764 |

FOREIGN PATENT DOCUMENTS

EP     0 396 415 A2     11/1990

OTHER PUBLICATIONS

"Video object clustering segmentation", by Qi Lin et al., proceedings of the second international conference on machine learning and cybernetics, Nov. 2003, pp. 2840-2843.*
"Video Studio 7 Chinese Tutorial", Ulead Inc., Nov. 2003, pp. 48-52 and 84-87, Posts & Telecom Press.

* cited by examiner

*Primary Examiner*—William L Bashore
*Assistant Examiner*—Gregory A Distefano
(74) *Attorney, Agent, or Firm*—Sughrue Mion, PLLC

(57) ABSTRACT

Disclosed is an apparatus and method for searching for a video clip. The method for searching for the video clip in accordance with the present invention comprises the steps of a) displaying a predetermined number of video clips on a screen of a video play apparatus which plays a video file, b) selecting a specific video clip among the displayed video clips by a user, and c) dividing frames constructing the selected video clip according to a predetermined division reference, and displaying the video clip constructed of the divided frame.

13 Claims, 6 Drawing Sheets

APPARATUS AND METHOD FOR SEARCHING FOR A VIDEO CLIP

TECHNICAL FIELD

The present invention relates to an apparatus and a method for searching for a video clip and, more specifically, to an apparatus and a method for searching a video clip wherein when a user plays a video file, the video clip corresponding to a specific part of the played video file can be searched for more efficiently.

BACKGROUND ART

Figure 1:
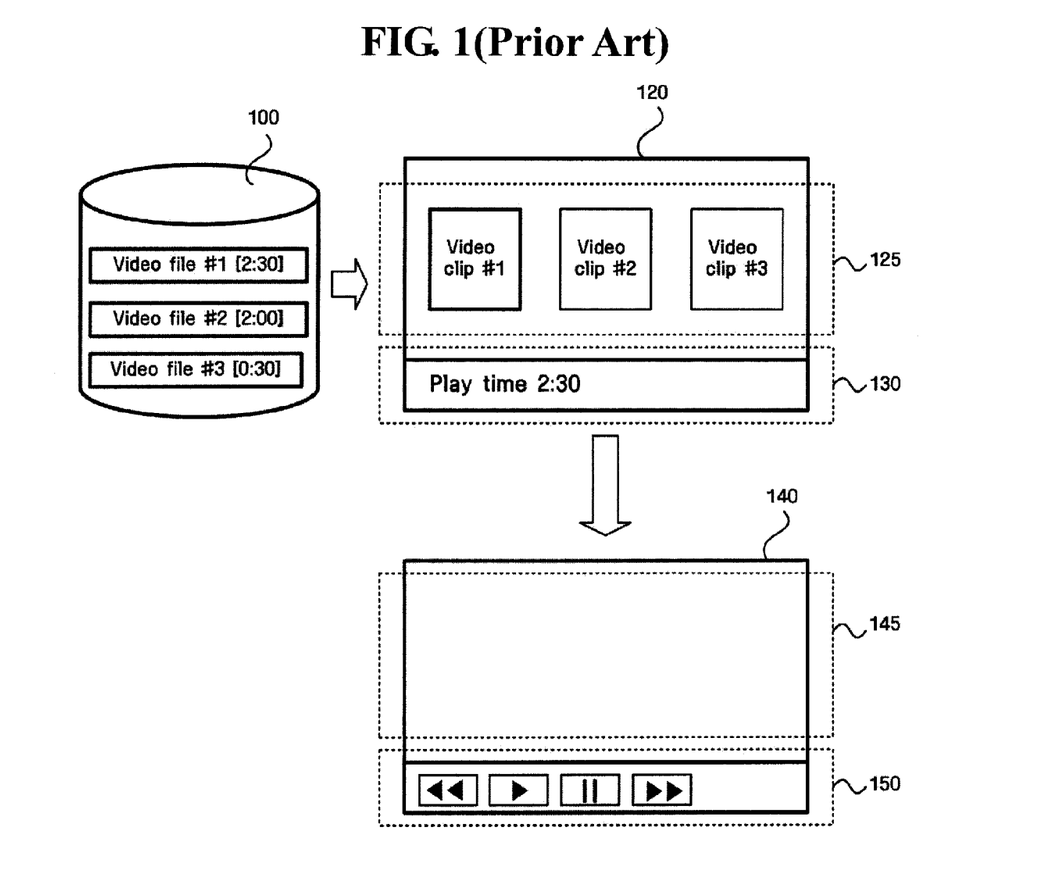
FIG. 1 is a view showing a user interface whereby a video clip is searched for in accordance with a conventional method.

A user may stop playing a video file in the course of his/her watching the video file. Later the user may wish to watch again the video file as from the part stopped. In this regard, there are two methods: one is to search for the stopped part by playing it at a double speed from the beginning of the file, and the other is to divide the entire video file by several pages, each having a predetermined volume to be selected. FIG. 1 is a view showing the former method according to the related art, and FIG. 2 is a view showing the latter method according to the related art.

In FIG. 1, an apparatus (not shown) to play a video file provides a first user interface 120 which includes a display area 125 and an information area 130 to display information on video clips selected in the display area. At this time, each of the video clips is extracted from each of the video files stored in a video data storage medium 100 such as a CD, a hard disk and a memory card. When the user selects a first video clip form the first user interface 120, a video file corresponding to the selected video clip is played. At this time, the apparatus can provide a second user interface 140 to play the video file, and the second user interface includes an area 145 to play a screen and an area 150 to perform a play control function.

In a user interface structure shown in FIG. 1, when the user plays and watches a video file to a predetermined part and then wishes to play again the video file from that part, the user has to select and search for the video file by repeating forward and backward operations from the beginning to that part. In such a method, it takes a long time to make a search, thereby causing an inconvenience. Especially, when searching for the end of the video file, or when the amount of video data is very large, it causes much inconvenience to the user.

Figure 2:
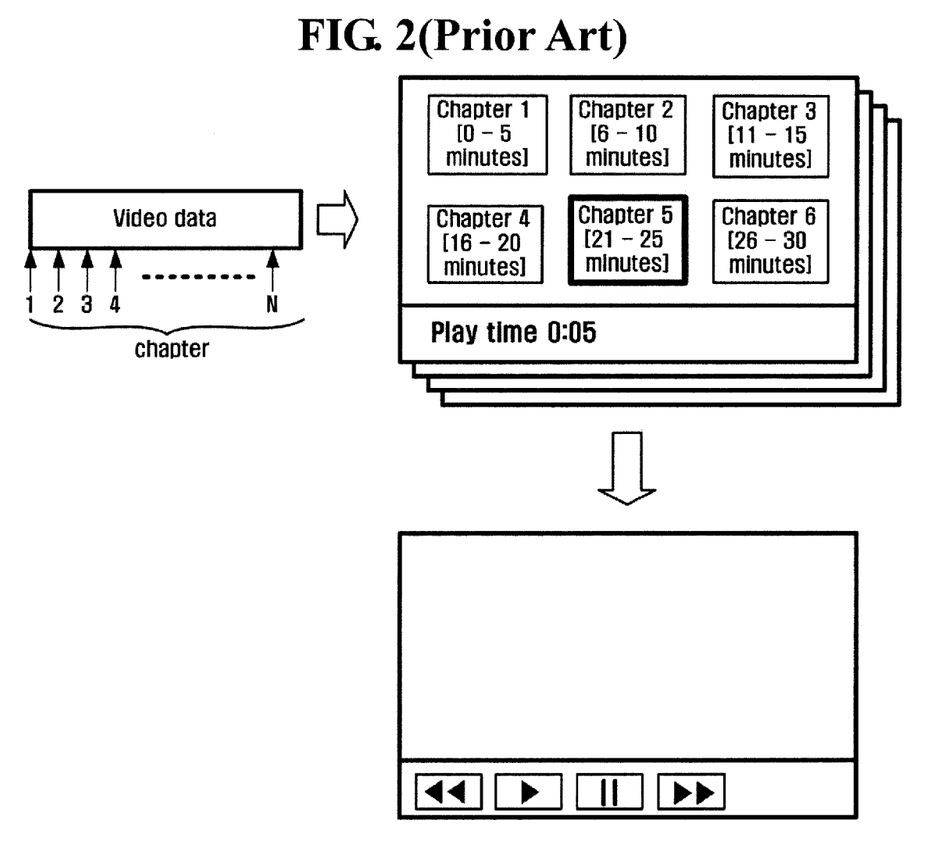
FIG. 2 is a view showing another user interface for searching for a video clip in accordance with a conventional method.

Meanwhile, in FIG. 2, the video file is divided and stored by a predetermined size (for example, a volume of 5 minutes), so that the user can more rapidly search for his or her desired part. At this time, each of the divided parts is called a chapter and a screen composed of a number of chapters is called a page, for the sake of convenience.

In other words, since the video file is stored in the unit of chapter, it is possible to have access to a desired part more rapidly compared with the method shown in FIG. 1. However, when the amount of video data increases, the number of the chapters also increases, and accordingly the number of the pages increases. As a result, it takes much time to search for many pages and function keys or function buttons should be used several times when moving the pages, thereby causing inconvenience. Also, since the user has to use the method shown in FIG. 1 to search for a precise position even though the user approached to a desired chapter, the method shown in FIG. 2 is not considered to be an efficient video clip searching method.

On the other hand, in the case of a user interface provided from software for playing a video file provided by a personal computer, it is possible to search for a desired video clip, with ease, using a slide-bar. However, a technical idea of the present invention can be applied to a video file playing apparatus which is operated by a remote control device such as a remote control, or a video file playing apparatus in which the slide-bar or a scroll bar cannot be used.

DISCLOSURE OF INVENTION

Technical Problem

In a user interface structure shown in FIG. 1, when the user plays and watches a video file to a predetermined part and then wishes to play again the video file from that part, the user has to select and search for the video file by repeating forward and backward operations from the beginning to that part: It takes a long time to make a search, thereby causing an inconvenience. Especially, when searching for the end of the video file, or when the amount of video data is very large, it causes much inconvenience to the user.

In a user interface structure shown in FIG. 2, since the number of the chapters also increases when the amount of video data increases, the number of the pages increases. As a result, it takes much time to search for many pages and function keys or function buttons should be used several times when moving the pages, thereby causing inconvenience.

Technical Solution

The present invention has been conceived to solve the problems described above. It is an object of the present invention to provide a method for enabling a user to search for a video clip more efficiently by dividing frames constructing a specific video clip selected by the user according to a predetermined reference and displaying the divided frames to the user.

Consistent with an exemplary embodiment of the present invention, there is provided a method for searching for a video clip, comprising displaying a predetermined number of video clips on a screen of a video play apparatus which plays a video file; selecting a specific video clip among the displayed video clips by a user, and dividing frames constructing the selected video clip according to a predetermined division reference, and displaying the video clip constructed of the divided frame.

Preferably, the frame is an I-frame (Intra frame) and the division reference divides a play time of the selected video clip by a predetermined interval.

Preferably, the method further comprises a step of selecting the specific video clip among the displayed video clips by the user when a predetermined terminating condition of the division reference is not satisfied, and repeating the step c), and the terminating condition is that a play time of the selected video clip is less than a predetermined time.

According to another aspect of the present invention, this invention provides a method for searching for a video clip, comprising the steps of: a) displaying a predetermined number of video clips on a screen of a video play apparatus which plays a video file; b) selecting a specific video clip among the displayed video clips by a user; c) providing a user interface capable of inputting a specific time to play the video file corresponding to the selected video clip by the user; and d) playing the video file corresponding to the selected video clip from a position corresponding to the input specific time among the selected video clip when the user inputs the specific time into the user interface.

Preferably, the step d) includes a sub-step of, when the user inputs the specific time into the user interface, playing the video file corresponding to the selected video clip from an I-frame (Intra-frame) closest to the position corresponding to the inputted specific time among the selected video clip.

According to yet another aspect of the present invention, this invention provides an apparatus for searching for a video clip providing a user interface including a display area where a predetermined number of video clips are displayed, and a video clip information area where information on a video clip selected by a user among the displayed video clips is displayed.

Preferably, frames constructing the selected video clip are divided on the display area according to a predetermined division reference, and the video clip which is constructed by the divided frame is displayed.

Preferably, the frame is an I-frame (Intra frame) and the division reference divides a play time of the selected video clip by a predetermined interval.

Preferably, the information on the video clip is information on a play time of the selected video clip.

Preferably, the user interface further includes a play control area to play the selected video clip.

Preferably, the apparatus provides a time input user interface when the user selects a specific video clip in the display area, and wherein when the user inputs a specific time into the time input user interface, the video file corresponding to the selected video clip is played from a position corresponding to the input specific time among the selected video clip.

DESCRIPTION OF DRAWINGS

The above and other features and advantages of the present invention will become more apparent to those of ordinary skill in the art by describing in detail preferred embodiments thereof with reference to the attached drawings in which.

MODE FOR INVENTION

Hereinafter, an apparatus and a method for searching for a video clip in accordance with an exemplary embodiment of the present invention with reference to accompanying drawings will be explained as follows.

Figure 3:
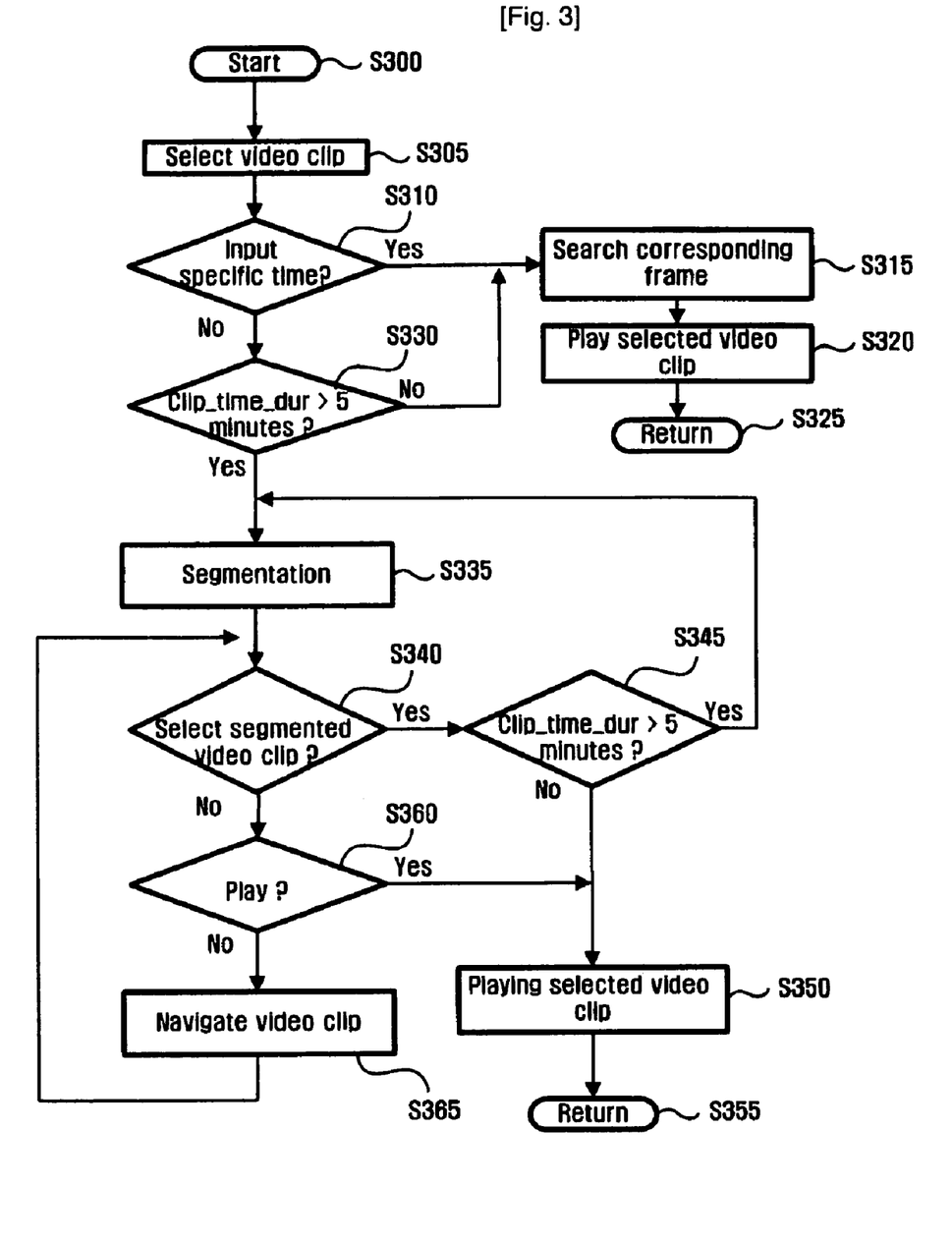
FIG. 3 is a flow chart showing a process to search for and play a video clip in accordance with an exemplary embodiment of the present invention.

FIG. 3 is a flow chart showing a process to search for and play a video clip in accordance with an exemplary embodiment of the present invention.

After a user starts an apparatus for playing a video file, the user performs an application involved in order to watch a video clip S300 as desired. At this time, the application preferably refers to an application for providing a user interface.

Each of the video clips for a number of video files which can be played by the apparatus is displayed on the user interface, and the user selects a video clip S305. At this time, the user interface may include an area for providing play information (for example, total play time) on the displayed video clip.

When the user selects the video clip, a time input interface which enables the user to input a specific time may be provided. At this time, the user may input time information corresponding to the time point which the time the user desires to watch the selected video clip reaches S310, within the total play time thereof.

When the user inputs proper time information to the time input interface, the application searches for the corresponding frame and starts to play the selected video clip S315 and S320. At this time, it is preferable that the frame is an I-frame (Intra-frame), and normally the I-frame occurs every 7/60 seconds. And, when the user inputs a specific time, an I-frame closest to a position corresponding to the input time is selected.

When the user does not input the time information to the time input interface, the application checks whether the total play time of the selected video clip exceeds 5 minutes or not S330. At this time, the 5 minutes is just used to make an explanation of the present invention with ease, and is time information being a reference for segmenting the video clip. Also, the total play time of the selected video clip is assigned as a parameter 'clip_time_dur' in the description of the present invention.

Figure 4:
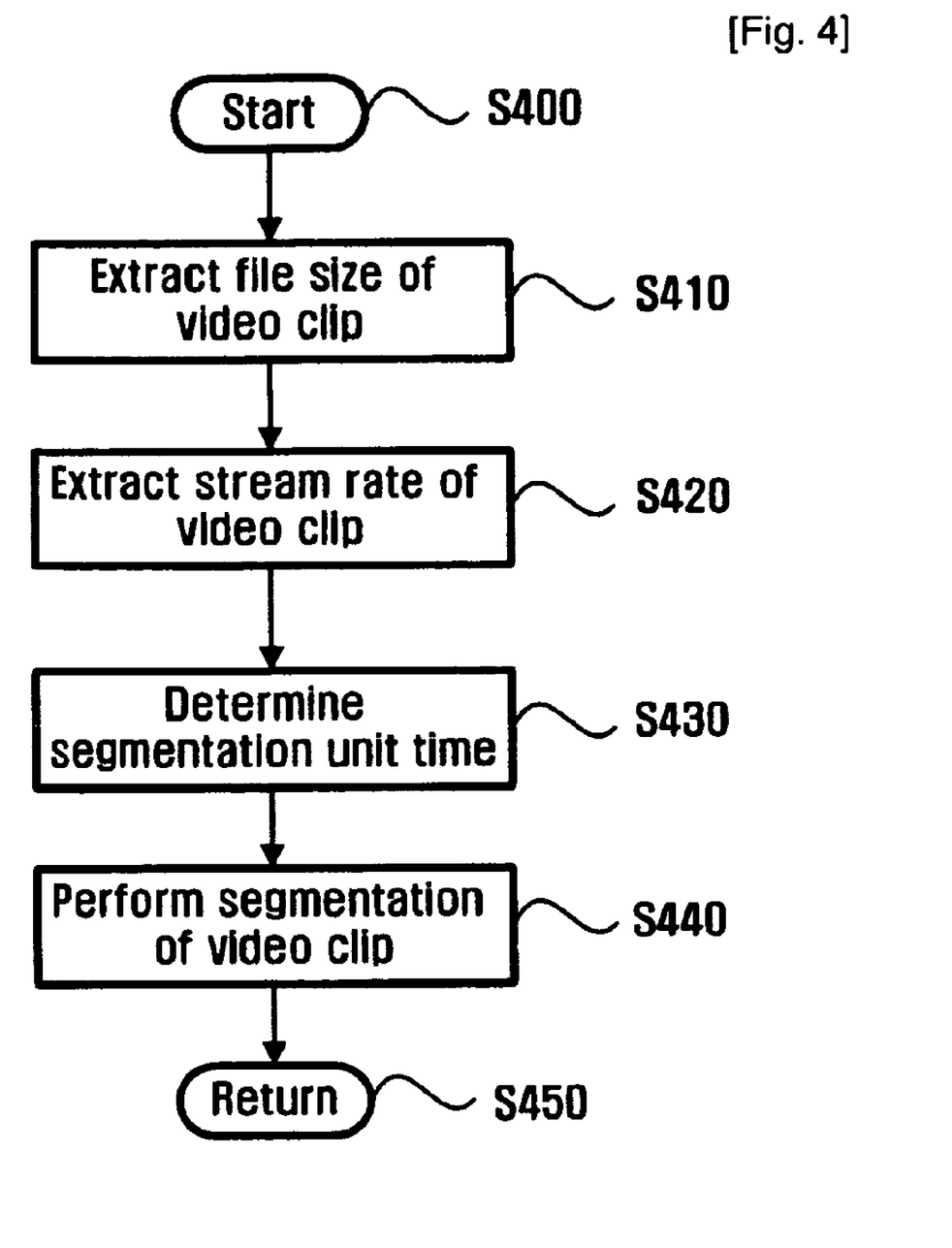
FIG. 4 is a flow chart showing a segmentation process in accordance with an exemplary embodiment of the present invention.

When the value of clip_time_dur does not exceed 5 minutes in step S330, the application starts to search for the corresponding frame and plays the selected video clip S315, S320. Otherwise, segmentation for the selected video clip is performed S335. Since the process of segmentation is shown in FIG. 4, the description will be given later.

When the user selects a segmented video clip (S340), the application checks whether the total play time of the selected video clip, i.e. clip_time_dur exceeds 5 minutes or not as in step S330, S345. At this time, when the total play time exceeds 5 minutes, step S335 is performed repeatedly, or the selected video clip is played, otherwise S350.

On the other hand when the user does not select the segmented video clip in step S340 but plays a highlighted video clip among a number of video clips in step S360, the highlighted video clip is played S350, S360.

When the user neither selects the segmented video clip In step 340 nor performs the play function in step S360, the application is set to be in a standby state since it is determined that the user navigates a number of video clips displayed and repeats step S340.

FIG. 4 is a flow chart showing a segmentation process in accordance with an exemplary embodiment of the present invention, which shows step S335 among the processes shown in FIG. 3 in more detail. That is, when the segmentation is started, the application extracts the size and the stream rate of the selected video clip S410, S420, and determines a unit time of segmentation S430. And then, the application performs the segmentation of the selected video clip using the information obtained in steps S410 to S430 S440.

FIGS. 5 to 8 illustrate a user interface which searches for and plays video clips in accordance with an exemplary embodiment of the present invention. At this time, the user interface may display 6 video clips on one screen, and the video clip may preferably be divided with reference to the I-frame.

Figure 5:
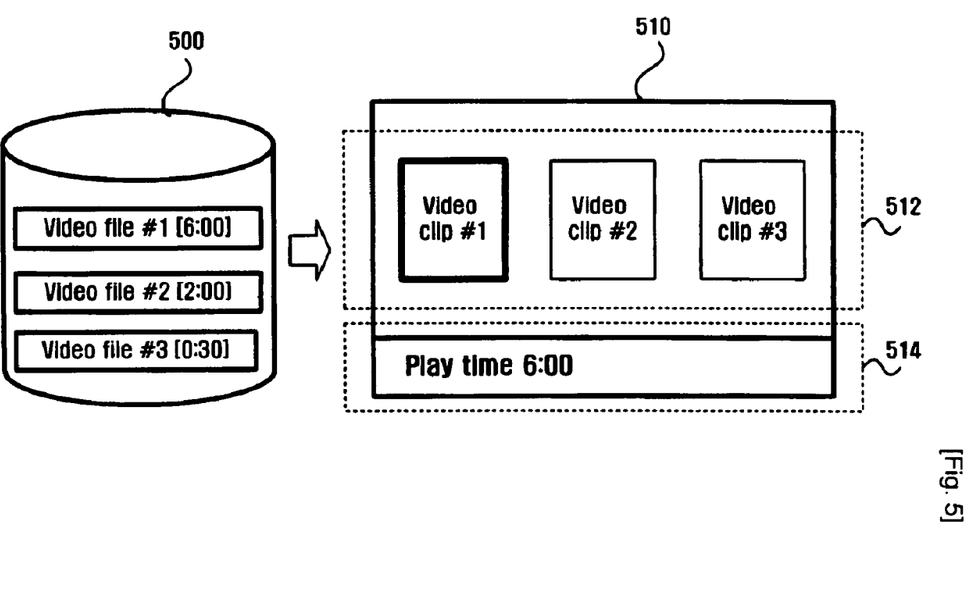
FIGS. 5 to 8 illustrate a user interface by which video clips are searched and then played in accordance with an exemplary embodiment of the present invention.
Figure 6:
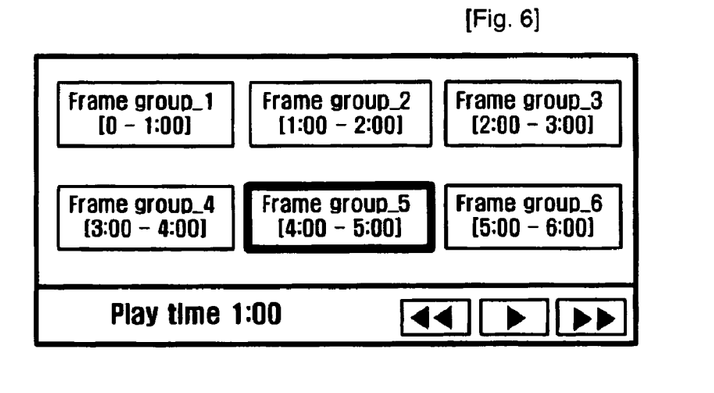

In FIG. 5, a video file playing apparatus (not shown) provides a user interface 510 including a display area 512 and an information area 514 that displays information on a video clip selected in the display area. At this time, each of the video clips is extracted and displayed from each of video files stored in a video data storage medium 500 such as a CD, a hard disk and a memory card. When the user selects a first video clip from the user interface 510, another user interface as shown in FIG. 6 is provided. On the other hand, the user interface may provide a time input interface with which the user can input desired time information after the user selects the first video clip. To the time input interface, the user inputs the time information corresponding to the time point which the time he or she desires to watch the video clip reaches, within the total play time of the selected video clip and plays the selected video clip from the desired time.

FIG. 6 displays segmented frame groups with respect to the video clips selected in FIG. 5. Since the play time of a video clip #1 in FIG. 5 is six (6) hours, it is shown in FIG. 6 that the video clip #1 is divided by one (1) hour so that six (6) frame groups are generated.

Figure 7:
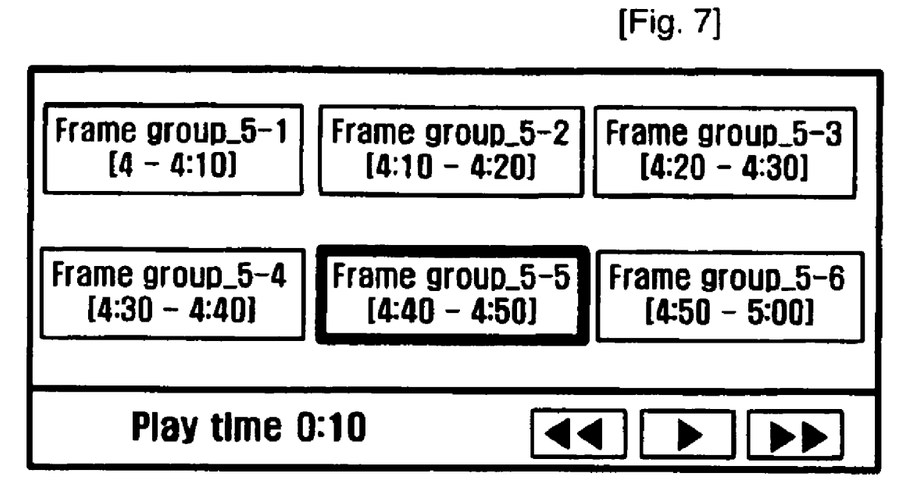
Figure 8:
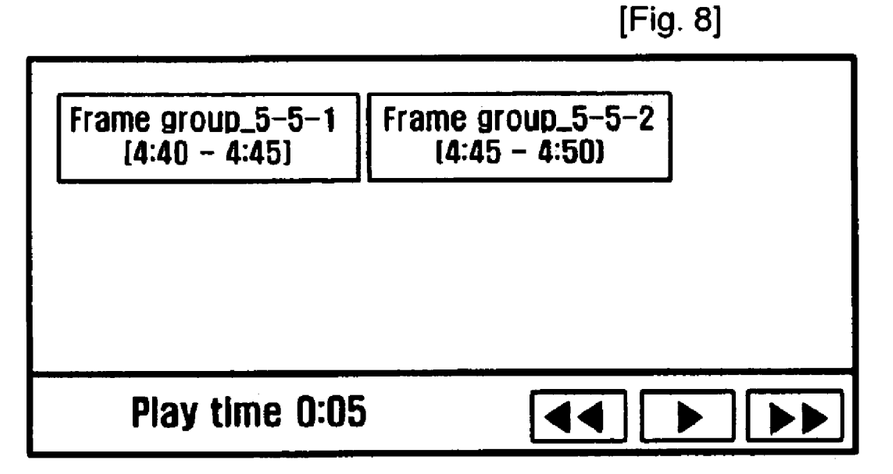

When the user selects a 'frame group_5' in FIG. 6, frames corresponding to the time between 4 hours and 5 hours within the total play time of the video clip #1 are divided in a unit of 10 minutes and 6 frame groups are generated as shown in FIG. 7. When the user selects a 'frame group_5-5' in FIG. 7, frames corresponding to the time between 4 hours 40 minutes and 4 hours 50 minutes are divided in a unit of 5 minutes within the total play time of the video clip #1 and 2 frame groups are generated as shown in FIG. 8. At this time, when the user selects and plays a 'frame group_5-5-1', the play starts from the frame corresponding to 4 hours 40 minutes among the total play time of the video clip #1.

INDUSTRIAL APPLICABILITY

In accordance with an exemplary embodiment of the present invention, a user can save time to search for a specific position of a user's desired video file. When the user already knows play time with respect to the specific position, the video file can be directly played from the corresponding position.

Although the exemplary embodiments and drawings of the present invention have been disclosed for illustrative purposes, those skilled in the art appreciate that various substitutions, modifications, changes and additions are possible, without departing from the scope and spirit of the invention as disclosed in the accompanying claims.

The invention claimed is:

1. A method for searching for a video clip, comprising:
   displaying a plurality of first video clips of a video file on a screen of a video playing apparatus;
   selecting a first video clip among the displayed first video clips;
   determining whether a total play time of the selected first video clip is greater than a predetermined time;
   if it is determined that the total play time of the selected first video clip is not greater than the predetermined time, playing the selected first video clip; and
   if it is determined that the total play time of the selected first video clip is greater than the predetermined time, segmenting the selected first video clip into a plurality of second video clips according to a predetermined division reference, and displaying the second video clips.

2. The method according to claim 1, wherein the segmenting the selected first video clip comprises segmenting the selected first video clip with reference to an I-frame (Intra frame).

3. The method according to claim 1, wherein the division reference is a predetermined time interval.

4. The method according to claim 1, further comprising:
   selecting a second video clip among the displayed second video clips;
   determining whether a total play time of the selected second video clip is greater than the predetermined time;
   if it is determined that the total play time of the selected second video clip is not greater than the predetermined time, playing the selected second video clip; and
   if it is determined that the total play time of the selected second video clip is greater than the predetermined time, segmenting the selected second video clip into a plurality of third video clips according to the predetermined division reference, and displaying the third video clips.

5. The method according to claim 1, wherein the termination condition is that a play time of the selected video clip is less than a predetermined time.

6. A method for searching for a video clip, comprising:
   displaying a plurality of first video clips of a video file on a screen of a video playing apparatus;
   selecting a first video clip among the displayed first video clips;
   determining whether a specific time to play the video file corresponding to the selected first video clip is input;
   if it is determined that the specific time is input, playing the video file corresponding to the selected first video clip from a position corresponding to the input specific time when the user inputs the specific time into the user interface;
   if it is determined that the specific time is not input, determining whether a total play time of the selected first video clip is greater than a predetermined time;
   if it is determined that the total play time of the selected first video clip is not greater than the predetermined time, playing the selected first video clip; and
   if it is determined that the total play time of the selected first video clip is greater than the predetermined time, segmenting the selected first video clip into a plurality of second video clips and displaying the second video clips.

7. The method according to claim 6, wherein the playing the video file includes playing the video file corresponding to the selected first video clip starting from an I-frame (Intra-frame) closest to the position corresponding to the input specific time when the user inputs the specific time into the user interface.

8. An apparatus for searching for a video clip, the apparatus comprising:
   a video playing apparatus;
   user interface means for providing a user interface which is displayed on a screen of the video playing apparatus, the user interface including a display area where video clips are displayed, and a video clip information area where information on a video clip selected among the displayed video clips is displayed, wherein the user interface means displays a plurality of first video clips of a video file, determines whether a total play time of a selected first videoclip among the displayed first video clips is greater than a predetermined time, displays the selected first video clip if it is determined that the total play time of the selected first video clip is not greater than the predetermined time, and segments the selected first video clip into a plurality of second video clips according to a predetermined division reference and displays the second video clips if it is determined that the play time of the selected first video clip is greater than the predetermined time.

9. The apparatus according to claim 8, wherein the frame refers to an I-frame (Intra frame).

10. The apparatus according to claim 8, wherein the division reference is a predetermined time interval.

11. The apparatus according to claim 8, wherein the information on the video clip refers to information on a play time of the selected video clip.

12. The apparatus according to claim 8, wherein the user interface further includes a play control area to play the selected video clip.

13. The apparatus according to claim 8, wherein the user interface means determines whether a total play time of a selected second video clip among the displayed second video clips is greater than the predetermined time, plays the selected second video clip if it is determined that the total play time of the selected second video clip is not greater than the predetermined time, and segments the selected second video clip into a plurality of third video clips and displays the third video clips if it is determined that the total play time of the selected second video clip is greater than the predetermined time.

* * * * *

UNITED STATES PATENT AND TRADEMARK OFFICE
CERTIFICATE OF CORRECTION

PATENT NO. : 7,647,556 B2
APPLICATION NO. : 10/586238
DATED : January 12, 2010
INVENTOR(S) : Kang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this

Sixteenth Day of November, 2010

David J. Kappos
*Director of the United States Patent and Trademark Office*